(12) United States Patent  
Arunasalam et al.

(10) Patent No.: US 9,235,219 B2  
(45) Date of Patent: Jan. 12, 2016

(54) MICROVALVE WITH INTEGRATED FLOW SENSING CAPABILITY

(71) Applicant: Zhejiang DunAn Hetian Metal Co., Ltd., Zhuji, Zhejiang (CN)

(72) Inventors: Parthiban Arunasalam, Austin, TX (US); Arvind Rao, Austin, TX (US)

(73) Assignee: Zhejiang Dunan Hetian Metal Co., Ltd., Zhuji, Zhejiang (CN)

(*) Notice: Subject to any disclaimer, the term of this patent is extended or adjusted under 35 U.S.C. 154(b) by 193 days.

(21) Appl. No.: 14/134,394

(22) Filed: Dec. 19, 2013

(65) Prior Publication Data

US 2014/0216572 A1 Aug. 7, 2014

Related U.S. Application Data

(60) Provisional application No. 61/746,291, filed on Dec. 27, 2012.

(51) Int. Cl.

| | |
|---|---|
| *F16K 31/02* | (2006.01) |
| *G05D 7/06* | (2006.01) |
| *G01F 1/684* | (2006.01) |
| *G01F 1/69* | (2006.01) |
| *G01F 15/00* | (2006.01) |
| *F25B 41/06* | (2006.01) |
| *F25B 49/02* | (2006.01) |

(52) U.S. Cl.
CPC .............. *G05D 7/0694* (2013.01); *G01F 1/684* (2013.01); *G01F 1/69* (2013.01); *G01F 15/005* (2013.01); *F25B 41/062* (2013.01); *F25B 49/02* (2013.01); *F25B 2400/15* (2013.01); *F25B 2600/2519* (2013.01); *F25B 2700/135* (2013.01); *Y10T 137/7759* (2015.04); *Y10T 137/7761* (2015.04)

(58) Field of Classification Search
CPC .......... G05D 7/0694; G01F 1/684; G01F 1/69; G01F 15/005; F25B 41/062; F25B 49/02; F25B 2400/15; F25B 2600/2519; F25B 2700/135; Y10T 137/7759; Y10T 137/7761
USPC ............ 137/486, 487.5, 613; 73/861, 861.08, 73/204.11
See application file for complete search history.

(56) References Cited

U.S. PATENT DOCUMENTS

| | | | | |
|---|---|---|---|---|
| 5,425,246 | A * | 6/1995 | Bessler | F25B 41/062 62/211 |
| 5,435,145 | A * | 7/1995 | Jaster | F25B 41/062 137/412 |
| 5,464,038 | A * | 11/1995 | Kruto | G05D 7/0635 137/486 |
| 5,865,205 | A * | 2/1999 | Wilmer | G05D 7/0635 137/2 |
| 5,909,078 | A * | 6/1999 | Wood | B81B 3/0024 310/306 |
| 5,955,817 | A * | 9/1999 | Dhuler | B81B 3/0024 310/307 |
| 5,996,739 | A * | 12/1999 | Hoffmann | F01M 1/16 137/486 |

(Continued)

*Primary Examiner* — Craig Schneider
*Assistant Examiner* — Minh Le
(74) *Attorney, Agent, or Firm* — MacMillan, Sobanski & Todd, LLC

(57) ABSTRACT

A system for controlling the flow of a fluid from a source to a load includes a source. An on/off type of control valve communicates with the source. A micro-electric mechanical system communicates with the on/off type of control valve. A consuming device communicates with the micro-electric mechanical system. An electronic controller that communicates with the consuming device and the source. The electronic controller measures a change in a parameter of the micro-electric mechanical system that results from the flow of fluid through the micro-electric mechanical system to sense a flow of fluid through a micro-electric mechanical system.

6 Claims, 2 Drawing Sheets

(56) References Cited

U.S. PATENT DOCUMENTS

| | | | | |
|---|---|---|---|---|
| 6,053,000 A * | 4/2000 | Levitin | F25B 41/062 | 62/205 |
| 6,360,772 B1 * | 3/2002 | Wu | G05D 7/0635 | 137/486 |
| 6,494,804 B1 * | 12/2002 | Hunnicutt | F15C 5/00 | 137/625.6 |
| 6,655,408 B2 * | 12/2003 | Linthorst | G01S 5/0009 | 137/10 |
| 6,761,420 B2 * | 7/2004 | Maluf | B81B 3/0024 | 137/14 |
| 6,845,962 B1 * | 1/2005 | Barron | B60T 8/366 | 137/596.16 |
| 7,011,378 B2 * | 3/2006 | Maluf | B81B 3/0024 | 137/14 |
| 7,140,384 B2 * | 11/2006 | Kang | G05D 7/0635 | 118/715 |
| 7,156,365 B2 * | 1/2007 | Fuller | H02M 3/156 | 251/129.04 |
| 7,210,502 B2 * | 5/2007 | Fuller | F04B 27/1804 | 137/596.16 |
| 7,335,396 B2 * | 2/2008 | Carpenter | C23C 16/45525 | 118/692 |
| 7,992,395 B2 * | 8/2011 | Zhang | F25B 41/062 | 62/115 |
| 8,499,786 B2 * | 8/2013 | Zolock | G05D 7/0635 | 137/487 |
| 8,851,117 B2 * | 10/2014 | Xie | F16K 99/0011 | 137/625.25 |
| 8,996,141 B1 * | 3/2015 | Alsaleem | F25B 49/02 | 700/37 |
| 2004/0188648 A1 * | 9/2004 | Xie | F16K 99/0001 | 251/11 |
| 2005/0144968 A1 * | 7/2005 | Shakespeare | F25B 13/00 | 62/298 |
| 2006/0124173 A1 * | 6/2006 | An | G05D 7/0635 | 137/487.5 |
| 2008/0072611 A1 * | 3/2008 | Ahmed | F25B 49/02 | 62/175 |
| 2009/0272439 A1 * | 11/2009 | Holden | F25B 41/065 | 137/14 |
| 2011/0127455 A1 * | 6/2011 | Hunnicutt | F16K 99/0044 | 251/284 |
| 2012/0090703 A1 * | 4/2012 | Li | F16H 61/0251 | 137/487.5 |
| 2012/0204974 A1 * | 8/2012 | Sakasegawa | G01F 1/684 | 137/486 |
| 2014/0020417 A1 * | 1/2014 | Perez | F25B 41/062 | 62/126 |

* cited by examiner

MICROVALVE WITH INTEGRATED FLOW SENSING CAPABILITY

CROSS-REFERENCE TO RELATED APPLICATIONS

This application claims the benefit of U.S. Provisional Application No. 61/746,291, filed Dec. 27, 2012, the disclosure of which is incorporated herein by reference.

BACKGROUND OF THE INVENTION

This invention relates in general to microvalves of the general type described and illustrated in U.S. Pat. Nos. 7,210, 502, 7,803,281, 8,011,388, 8,113,482, and 8,156,962 and in U.S. Published Patent Application Nos. 2007/0172362, 2007/ 0251586, 2008/0042084, 2009/0123300, 2010/0012195, 2010/0084031, 2011/0127455, 2012/0000550, 2012/ 0145252, 2012/0140416, 2012/0295371, and 2012/0299129. The disclosures of all of these patents and patent applications are incorporated herein by reference.

In particular, this invention relates to an improved system for a microvalve that is provided with an integrated capability of sensing the flow of fluid therethrough for controlling the operation of the microvalve in response thereto.

A typical refrigerant cooling system for a device to be cooled includes a source, such as a compressor, that selectively provides a fluid, such as a liquid refrigerant, to a consuming device, such as an evaporator coil. To accomplish this, the source communicates through a temperature-responsive solenoid or other on/off type of control valve and through a microvalve or other micro-electric mechanical system to the consuming device. The solenoid valve can be selectively actuated to operate in either (1) an opened condition that permits liquid refrigerant to flow from the source to the microvalve or (2) a closed condition to prevent liquid refrigerant from flowing from the source to the microvalve. The microvalve, on the other hand, can be operated to modulate or otherwise control the amount of liquid refrigerant flowing therethrough to the consuming device. Thereafter, liquid refrigerant flows from the consuming device through a superheat or similar electronic controller back to the source of liquid refrigerant.

In normal operation of the refrigerant cooling system, when the sensed temperature of the device to be cooled (as determined by a temperature sensor) increases above a predetermined target temperature, the solenoid valve is caused to be opened. As a result, liquid refrigerant is allowed to flow through the solenoid valve from the source to the microvalve. The microvalve is, in turn, operated by the superheat or similar electronic controller to modulate or otherwise control the flow of liquid refrigerant therethrough to the consuming device as needed.

Subsequently, when the sensed temperature of the device to be cooled decreases below the predetermined target temperature, it is desirable to cease the flow of liquid refrigerant from the source to the consuming device. To accomplish this, the solenoid valve is initially closed. When this occurs, all of the remaining fluid contained within the microvalve is drawn out of the microvalve into the consuming device. As a result, the pressure of the fluid contained in the line downstream of the solenoid valve (as measured by a fluid pressure sensor that is typically provided as part of the superheat or similar electronic controller) drops to near zero. When this close-to-zero pressure situation occurs, the microvalve is then operated by the superheat or similar electronic controller to a fully closed condition.

Thereafter, when the sensed temperature of the case of the device to be cooled increases above the predetermined target temperature, the solenoid valve is caused to be re-opened to permit the flow of the liquid refrigerant from the source into the microvalve. However, because the fluid pressure sensor is located downstream of the microvalve as part of the superheat or similar electronic controller, the rise in the fluid pressure at the microvalve cannot be detected instantaneously by the superheat or similar electronic controller, which would preferably respond by opening or modulating the operation of the microvalve very quickly after the solenoid valve is re-opened. Rather, initially after the solenoid valve is re-opened, only a small amount of the liquid refrigerant passes through the microvalve and the consuming device to the superheat or similar electronic controller. That small amount of the liquid refrigerant eventually is sensed by the fluid pressure sensor provided as part of the superheat or similar electronic controller, which causes the microvalve to be re-opened.

Thus, it can be seen that there is an undesirably long period of time during which the pressure sensor continues to sense the close-to-zero pressure situation and maintain the microvalve in a closed condition, even after the solenoid valve has been re-opened to permit flow of the liquid refrigerant from the source into the microvalve. As a result, an undesirably long period of time occurs before the pressurized fluid is supplied in a sufficient quantity through the microvalve to the consuming device, thereby allowing cooling of the device to be cooled. Thus, it would be desirable to provide an improved system that avoids this problem.

SUMMARY OF THE INVENTION

This invention relates to an improved system for controlling the flow of a fluid from a source to a load. The system includes a source of fluid, an on/off type of control valve that communicates with the source, a micro-electric mechanical system that communicates with the on/off type of control valve, a consuming device that communicates with the micro-electric mechanical system, and an electronic controller that communicates with the consuming device and the source. The electronic controller measures a change in a parameter of the micro-electric mechanical system that results from the flow of fluid through the micro-electric mechanical system to sense a flow of fluid through a micro-electric mechanical system.

Various aspects of this invention will become apparent to those skilled in the art from the following detailed description of the illustrated embodiments, when read in light of the accompanying drawings.

DETAILED DESCRIPTION OF THE ILLUSTRATED EMBODIMENTS

Figure 1:
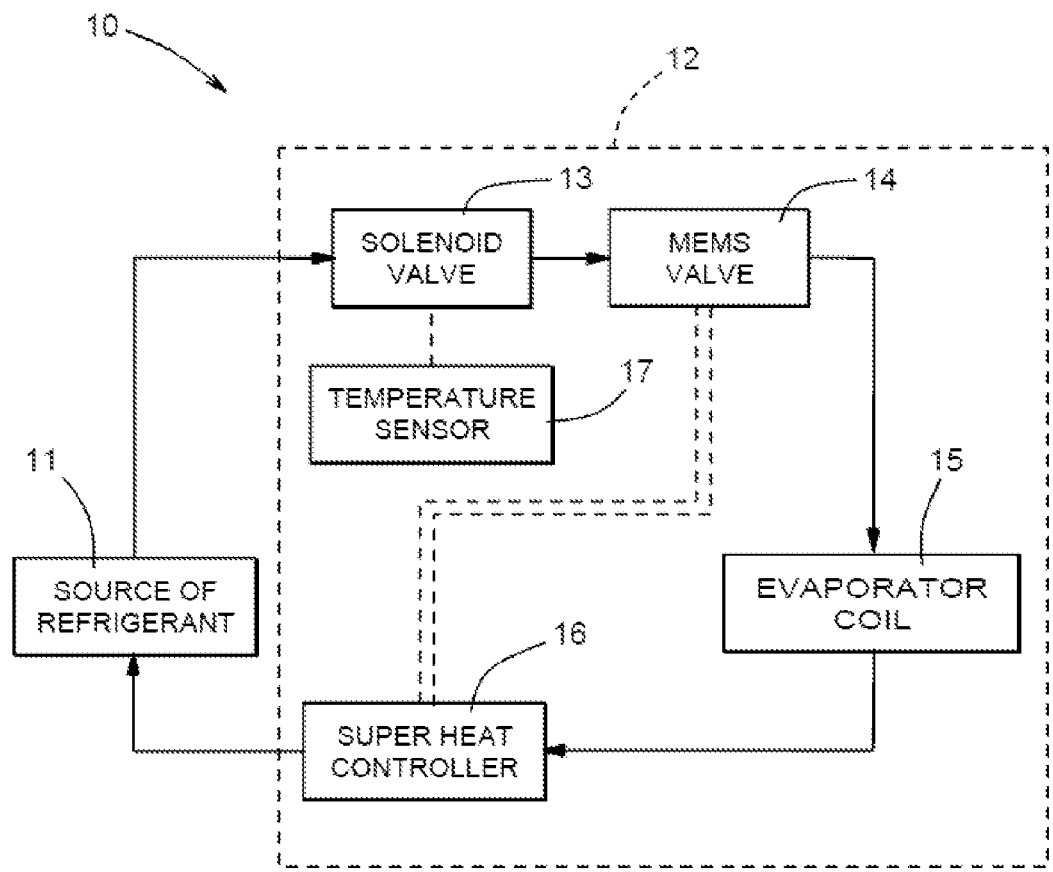
FIG. 1 is a block diagram of a first embodiment of a system for controlling the flow of a fluid from a source to a load that includes a microvalve having a flow sensing capability in accordance with this invention.

Referring now to the drawings, there is illustrated in FIG. 1 a schematic diagram of a first embodiment of a system, indicated generally at 10, for controlling the flow of a fluid from a source 11 to a load 12. In the illustrated system 10, a fluid (such as a liquid refrigerant) is supplied from the source 11, such as a compressor, through a solenoid valve 13 or other on/off type of control valve and through a microvalve 14 or other micro-electric mechanical system to a consuming device 15, such as a conventional evaporator coil. The solenoid valve 13 or other conventional flow-regulating structure is provided between the source 11 of liquid refrigerant and the microvalve 14. The solenoid valve 13 is typically used in an on/off manner to selectively permit or prevent the flow of the liquid refrigerant therethrough to the microvalve 14 in the manner described above. When actuated to an opened condition, the solenoid valve 13 permits liquid refrigerant to flow from the source 11 to the microvalve 14. The microvalve 14, on the other hand, can be operated to control the amount of liquid refrigerant flowing therethrough to the consuming device 15, as also described above. Thereafter, liquid refrigerant flows from the consuming device 15 through a superheat controller 16 or similar electronic controller back to the source 11 of liquid refrigerant. The superheat controller 16 includes a fluid pressure sensor (not shown) for a purpose that will be described below.

In normal operation of the refrigerant cooling system 10, when the sensed temperature of the device to be cooled (as determined by a conventional temperature sensor 17 connected to the solenoid valve 13) increases above a predetermined target temperature, the solenoid valve 13 is caused to be opened, thereby allowing the flow of liquid refrigerant therethrough from the source 11 to the microvalve 14. The microvalve 14 is, in turn, operated to modulate or otherwise control the flow of liquid refrigerant therethrough to the consuming device 15 as needed.

Subsequently, when the sensed temperature of the device to be cooled decreases below the predetermined target temperature, it is desirable to cease the flow of liquid refrigerant from the source to the consuming device 15. To accomplish this, the solenoid valve 13 is initially closed. When this occurs, all of the remaining fluid contained within the microvalve 14 is drawn out of the microvalve 14 into the consuming device 15. As a result, the pressure of the fluid contained in the line downstream of the solenoid valve 13 (as measured by a fluid pressure sensor that is typically provided as part of the superheat or similar electronic controller 16) drops to near zero. When this close-to-zero pressure situation occurs, the microvalve 14 is then operated by the superheat or similar electronic controller 16 to a fully closed condition.

Thereafter, when the sensed temperature of the device to be cooled increases above the predetermined target temperature, the solenoid valve 13 is initially caused to be re-opened to permit flow of the liquid refrigerant from the source 11 into the microvalve 14. However, because the fluid pressure sensor is located downstream of the microvalve 14 as part of the superheat or similar electronic controller 16, the rise in the fluid pressure at the microvalve 14 cannot be detected instantaneously (or at least sufficiently rapidly) by the superheat or similar electronic controller 16, which would preferably respond by opening or modulating the operation of the microvalve 14 very quickly after the solenoid valve 13 is re-opened. To allow this to occur, the microvalve 14 of this invention is used as a flow sensor to detect the presence of the in-rushing liquid refrigerant or other fluid and thereby allow the operation of the microvalve 14 to begin quickly after the solenoid valve 13 has been re-opened without the undesirable delay discussed above.

When the solenoid valve 13 is subsequently opened, the liquid refrigerant will flow into the microvalve 14 as described above. When such fluid reaches the conventional rib structure (not shown) of the actuator portion of the microvalve 14 (or any other desired component thereof), the change in temperature (which occurs as a result of thermal conductivity from contact with the liquid refrigerant) will cause the electrical resistance of such ribs or other structure of the microvalve 14 to change. This invention contemplates that the change in the electrical resistance of the ribs or other structure of the microvalve 14 (caused by the change in temperature thereof) is used as a detection mechanism that quickly indicates that the flow of fluid into the microvalve 14 has begun. When this change in electrical resistance (or, alternatively, a change in any other parameter in the microvalve 14 that results from the change in temperature) occurs, the microvalve 14 is operated immediately by the superheat or similar electronic controller 16 to begin modulating the flow of fluid therethrough to the consuming device 15.

The measurement of the electrical resistance of the ribs or other structure of the microvalve 14 can be accomplished in any desired manner. For example, it is known that the electrical resistance of an electrically conductive material will change with the temperature thereof. Thus, a source of electrical energy (which may, for example, be included within the superheat or similar electronic controller 16) can be used to apply an electrical current through such ribs or other structure of the microvalve 14. The source of electrical energy may, for example, be embodied as a conventional pulse width modulation circuit. Regardless of its nature, the source of electrical energy causes an electrical current to flow through the ribs or other structure of the microvalve 14. The magnitude of such electrical current will vary with the change in the electrical resistance of the ribs or other structure of the microvalve 14 caused by the change in temperature thereof. Thus, by using a conventional electrical current or other sensor (which may also, for example, be included within the superheat or similar electronic controller 16), the change in the electrical resistance of the ribs or other structure of the microvalve 14 (caused by the changes in temperature resulting from the flow of fluid through the microvalve 14) can be measured and acted upon by the superheat or similar electronic controller 16. Thus, the microvalve 14 be operated immediately by the superheat or similar electronic controller 16 to begin modulating the flow of fluid therethrough to the consuming device 15 more quickly than previously available.

The fluid flow sensing capability of this invention may embodied in either an on/off manner or in a graduated manner. In the on/off manner of fluid flow sensing, a signal is generated when it is determined that any predetermined amount of fluid is flowing through the microvalve 14. This can be accomplished, for example, by comparing the sensed electrical resistance of the ribs or other structure of the microvalve 14 with a predetermined threshold electrical resistance. In the graduated manner of fluid flow sensing, a signal is generated that is representative of the rate at which fluid is flowing through the microvalve 14. This can be accomplished, for example, by measuring the rate of change of the electrical resistance of the ribs or other structure of the microvalve 14.

Figure 2:
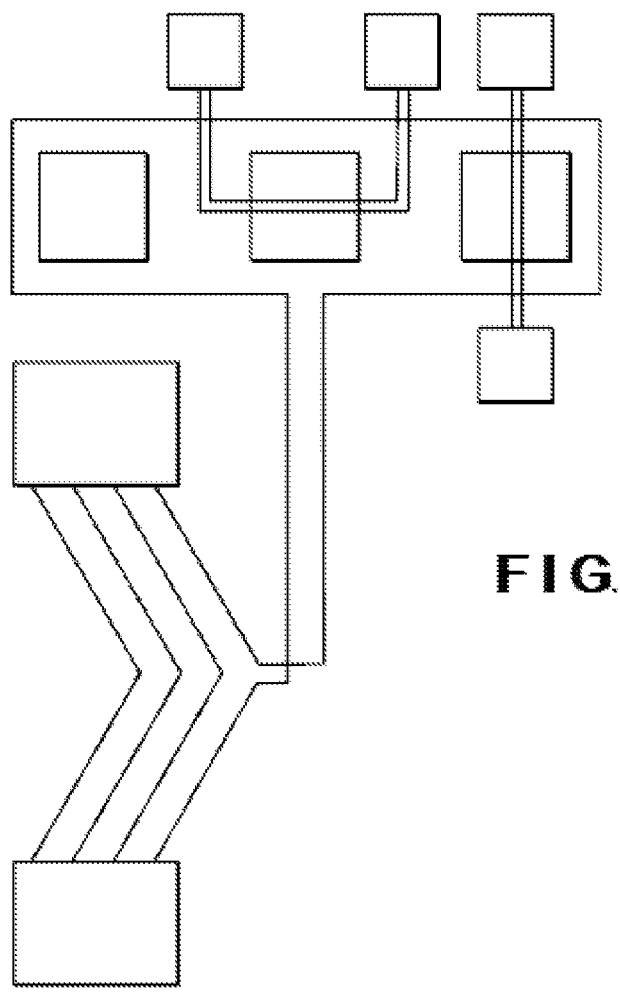
FIG. 2 is a schematic diagram of a second embodiment of a system for controlling the flow of a fluid from a source to a load that includes a microvalve in accordance with this invention.
Figure 3:
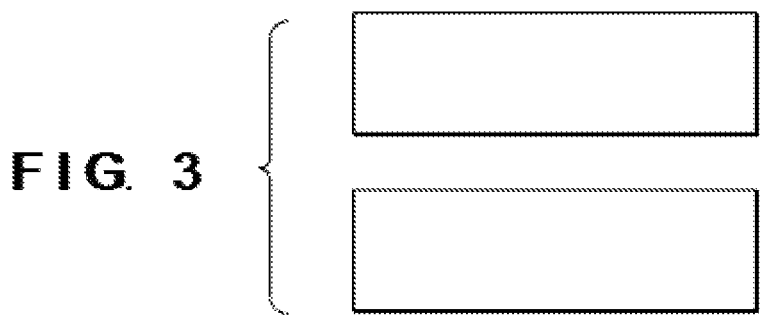
FIG. 3 is an enlarged schematic diagram of a portion of the second embodiment of the system illustrated in FIG. 2.

FIGS. 2 and 3 schematically illustrate a second embodiment of a system for controlling the flow of a fluid from a source to a load that includes a microvalve in accordance with this invention. The second embodiment is, for example, specifically adapted for use with the microvalve that is illustrated FIGS. 11 through 16 of U.S. Pat. No. 7,210,502. As shown in FIGS. 2 and 3, an actuator arm of the microvalve is connected to a generally L-shaped valve having three microports (illustrated as being generally square) provided therethrough. The illustrated microports are shown as being a normally open microport (NO), a normally closed microport (NC), and a control microport located between the normally open and normally closed microports. The normally closed microport (NC) and a control microport have respective ribs extending therethrough (see FIG. 3 for detail), and wire bonds are provided at the ends of each of these ribs to facilitate their connections to a power monitor or other measurement device. The ribs can be used as variable resistive structures to measure the change in temperature in the manner described above.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A method of sensing a flow of fluid through a system comprising the steps of:
    (a) providing a source of fluid;
    (b) providing an on-off type of control valve that communicates with the source;
    (c) providing a micro-electric mechanical system that communicates with the on-off type of control valve, wherein the micro-electric mechanical system is a microvalve having a rib structure;
    (d) providing a consuming device that communicates with the micro-electronic mechanical system;
    (e) providing an electronic controller that communicates with the consuming device and the source of fluid;
    (f) providing a flow of fluid through the micro-electric mechanical system; and
    (g) measuring a change in a parameter of the micro-electric mechanical system that results from the flow of fluid through the micro-electric mechanical system to sense a flow of fluid through the system.

2. The method defined in claim 1 wherein step (g) is performed by measuring a change of electrical resistance of the rib structure of the microvalve.

3. The method defined in claim 1 wherein step (g) is performed by measuring a change of temperature of the rib structure of the microvalve.

4. A system for controlling the flow of a fluid from a source to a load comprising:
    a source;
    an on/off type of control valve that communicates with the source;
    a micro-electric mechanical system that communicates with the on/off type of control valve, wherein the micro-electric mechanical system is a microvalve having a rib structure;
    a consuming device that communicates with the micro-electric mechanical system; and
    an electronic controller that communicates with the consuming device and the source; wherein the electronic controller measures a change in a parameter of the micro-electric mechanical system that results from the flow of fluid through the micro-electric mechanical system to sense a flow of fluid through a micro-electric mechanical system.

5. The system defined in claim 4 wherein the electronic controller measures a change of electrical resistance of the rib structure of the microvalve.

6. The system defined in claim 4 wherein the electronic controller measures a change of temperature of the rib structure of the microvalve.

* * * * *